United States Patent [19]

Babcock

[11] 3,924,832

[45] Dec. 9, 1975

[54] IN-LINE CONTROL VALVE

[76] Inventor: Donald Babcock, 5532 W. 103rd Place, Oak Lawn, Ill. 60453

[22] Filed: Sept. 27, 1974

[21] Appl. No.: 509,800

[52] U.S. Cl. ............ 251/301; 137/625.45; 222/557; 251/228; 251/259; 251/302; 251/345
[51] Int. Cl.² ......................................... F16K 3/04
[58] Field of Search .......... 251/341, 343, 344, 345, 251/206, 208, 367, 301, 302, 148, 152, 228, 257, 259, 340; 403/335, 336, 337; 285/331; 137/625.41, 525.45, 247.19, 625.15, 625.31, 625.44, 630.21; 222/625.44, 630.21, 557

[56] References Cited
UNITED STATES PATENTS

| 878,304 | 2/1908 | McAdoo | 222/557 |
|---|---|---|---|
| 1,062,064 | 5/1913 | Ward | 251/174 |
| 1,585,163 | 5/1926 | Milner | 251/152 |
| 2,883,150 | 4/1959 | Musser | 251/340 |
| 2,889,852 | 6/1959 | Dunlap | 251/206 |
| 2,909,197 | 10/1959 | Liley | 251/206 |
| 3,109,457 | 11/1963 | Oliveau | 137/625.45 |
| 3,446,406 | 5/1969 | Trott | 222/557 |

FOREIGN PATENTS OR APPLICATIONS

| 765,260 | 1/1957 | United Kingdom | 137/625.31 |
|---|---|---|---|
| 1,335,039 | 7/1963 | France | 251/302 |

*Primary Examiner*—William R. Cline
*Assistant Examiner*—H. Jay Spiegel
*Attorney, Agent, or Firm*—Edward C. Threedy

[57] ABSTRACT

An orifice control valve for interposition in end-to-end aligned pipe lines having a manually rotatable peripheral control ring positioned about two identical aligned connectors, with the control ring adapted to pivot a flow control device between an open and closed valve position.

8 Claims, 11 Drawing Figures

IN-LINE CONTROL VALVE

SUMMARY OF THE INVENTION

A so-called in-line control valve having complementary end plates adapted to be threadably connected between juxtapositioned pipe ends for controlling the flow of fluid therethrough.

The complementary end plates are connected in spaced facial abutment to provide an axial opening therethrough. Interposed between the spaced end plates is a pivotal valve plate providing an orifice of a diameter equal to the axial opening provided by the confronting end plates. An actuator ring embraces the periphery of the end plates and has a loose connection with the valve plate, so that upon rotation of the ring about the peripheral edges of the end plates, the valve plate will be pivoted therebetween about its fixed pivot, so as to align its orifice with the axial openings formed in the end plates.

Both the axial aligned openings provided by each of the end plates, as well as the valve orifice formed in the valve plate, are suitably sealed so as to prevent leakage of the fluid controlled thereby.

The invention will be best understood by reference to the accompanying drawings, in which there is shown the preferred embodiment, and wherein.

Figure 1:
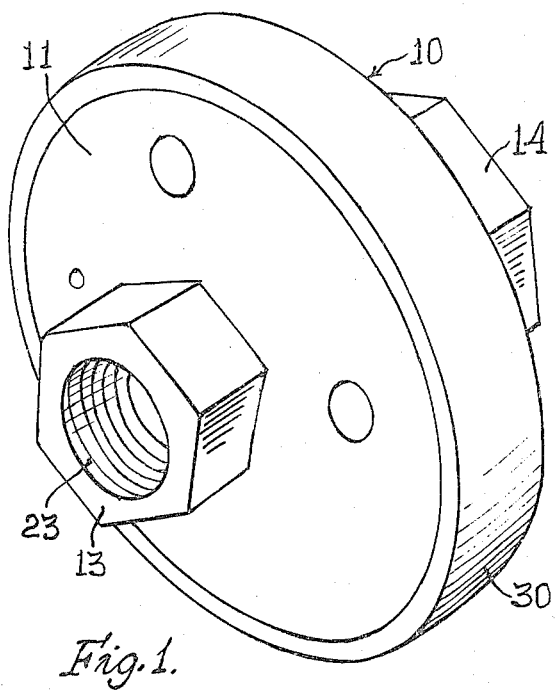
FIG. 1 is a perspective view of the control valve.

As shown in FIG. 1, the in-line valve 10 comprises end plates 11 and 12, each of which provides internally threaded couplers 13 and 14 which are adapted to be threadably connected to confronting end portions of pipe sections (not shown). Each of the end plates 11 and 12 provides a circular face 15 adapted to be disposed in spaced parallel relation. Each of the confronting faces 15 of the end plates 11 and 12 provides a plurality of laterally protruding bosses 16, 17 and 18, each of which provides a center opening 19.

The arrangement is such that when the end plates 11 and 12 are so arranged that their confronting faces 15 are in spaced-apart relationship, the bosses 16, 17 and 18 will mate and function as spacers between the end plates 11 and 12, with the openings 19 formed therein aligned so as to readily accept suitable connectors, such as rivets or the like.

Within a cavity 20 (see FIG. 11) formed by the spaced apart end plates 11 and 12, there is positioned a valve plate 21. The valve plate 21 provides a circular orifice 22, which is of a diameter equal to the fluid passage cavity 23 formed through each of the couplers 13 and 14. The valve plate 21 also provides a pivot hole 24 which is adapted to have journalled therein one set of confronting bosses, for example, 16, provided by the circular face 15 of each of the end plates 11 and 12 (see FIG. 11).

By this arrangement the valve plate 21 is positioned within the cavity 20 formed between the end plates 11 and 12 and is pivotally mounted upon the abutting bosses 16 provided thereby. The outer edge of the valve plate 21 is formed so as to provide a laterally offset portion 25 which is notched as at 26 so as to provide a key socket. The valve plate 21 also provides on either side face thereof a continuous elongated groove 27 and 28 which each receive a gasket 29 as shown in dotted lines in FIG. 2.

Adapted to embrace the peripheral edges of each of the end plates 11 and 12 is an actuator ring 30. The ring 30 provides on its inner surface a hub 31 which is of a thickness sufficient to be projected between adjacent peripheral edge portions of the confronting end plates 11 and 12, as shown in FIG. 2.

Internally within the actuator ring 30 and extending radially inwardly of the hub 31 thereof, is a key 32. The key 32 has its opposite end walls 33 and 34 formed in substantially S-shaped configuration, while its inner edge is concave, as at 35, the arrangement being such that the key 32 is adapted to freely sit within the key socket 26 formed in the peripheral edge of the valve plate 21 when the latter is pivotally mounted upon the bosses 16 of the spaced confronting end plates 11 and 12.

Figure 2:
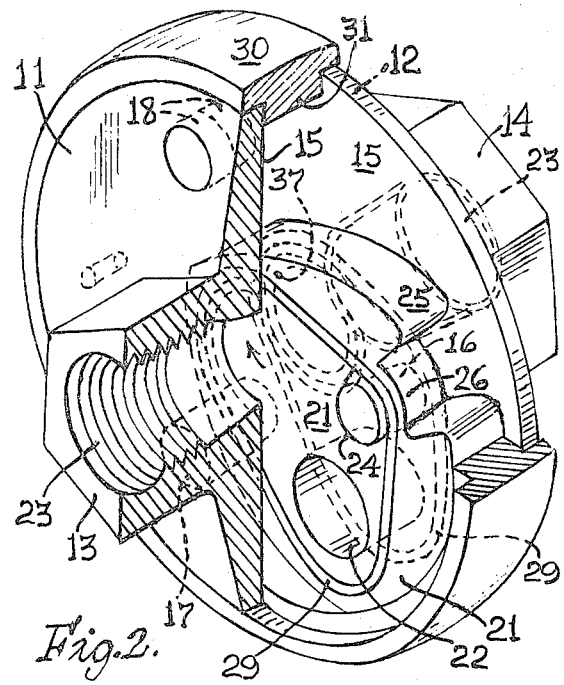
FIG. 2 is a detailed sectional view showing the internal portions of the control valve.
Figures 3, 4:
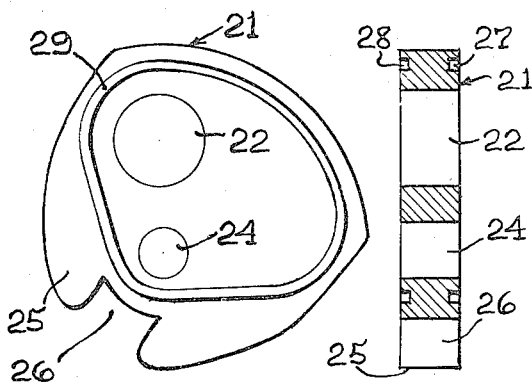
FIG. 3 is a side view of the valve plate.
FIG. 4 is a detailed sectional end view of the valve plate of FIG. 3.
Figure 5:
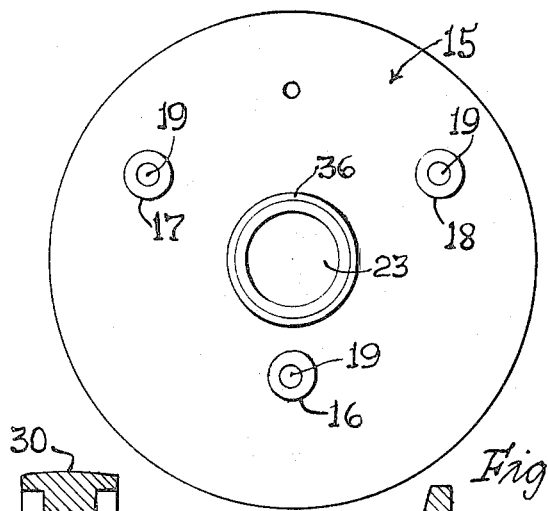
FIG. 5 is a side view of the inner face of one of the end plates of the valve.
Figures 6, 7:
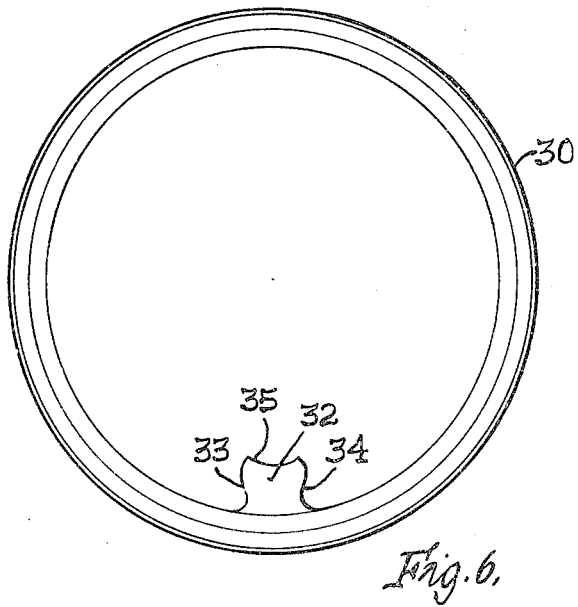
FIG. 6 is a side view of the actuator ring.
FIG. 7 is a detailed sectional end view of the actuator ring of FIG. 6.
Figure 8:
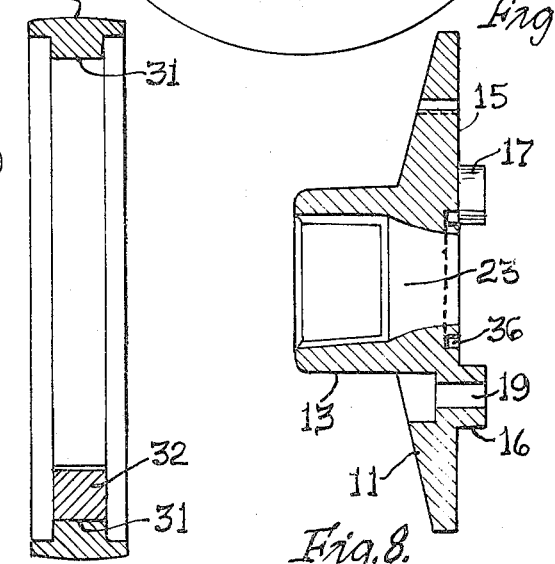
FIG. 8 is a detailed sectional view of one of the end plates.
Figure 11:
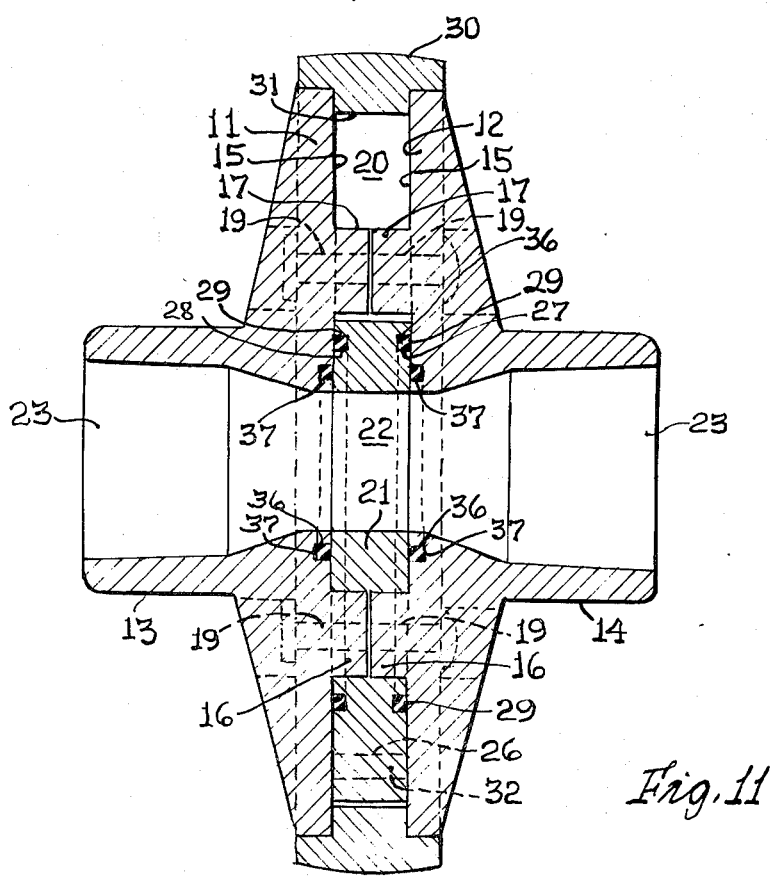
FIG. 11 is a detailed sectional view of the control valve.

It should also be noted that on the inner face 15 of the end plates 11 and 12 and encircling the fluid passage cavity 23 formed therein, is an annular groove 36, which is adapted to receive a sealing gasket 37 (shown in dotted lines in FIG. 2; see also FIG. 11).

From the foregoing, it is apparent that the valve plate 21, while pivotally mounted between the confronting circular faces 15 of the end plates 11 and 12, may be pivoted by rotation of the actuator ring 30 so as to align the orifice 22 formed in such valve plate 21, with the fluid passage cavity 23 formed in each of the end plates 11 and 12, thus providing full and complete communication therebetween.

By reason of the elongated gasket 29 which, as shown, embraces not only the orifice 22 formed in the valve plate 21, but also the point of pivotal connection between the pivot hole 24 formed in the valve plate 21 and the inner bosses 16 provided by the end plates 11 and 12, the valve plate 21, regardless of its pivotal movement or pivoted position, retains a sealed relation with the cavity 20 formed between the end plates 11 and 12. The sealing gasket 29 cooperates with the sealing gasket 37 to further seal the valve plate 21 during the latter's movement into and out of open or closed position.

Figure 9:
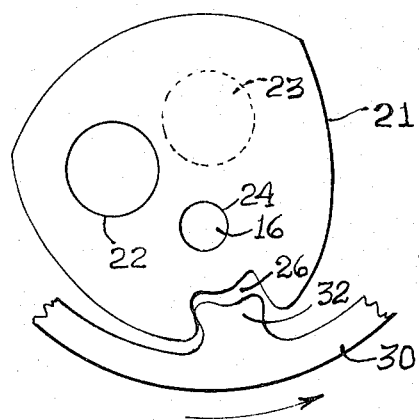
FIGS. 9 and 10 are fragmentary diagrammatic views of the interrelation between the valve plate and actuator ring.
Figure 10:
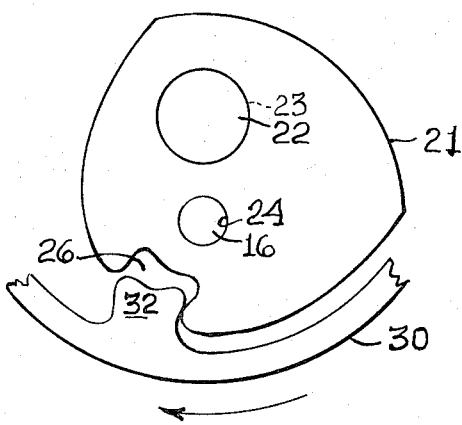

Referring to FIG. 9, it is readily seen that the key 32 provided by the actuator ring 30 has loose connection within the key socket 26 formed in the peripheral edge of the valve plate 21. In FIG. 9, the valve plate 21 is in a closed or sealed relation with respect to the fluid passage cavity 23 by reason of having its orifice 22 pivotally displaced with respect to such fluid passage cavity. As the outer ring is rotated in a clockwise direction as shown in FIG. 10, the valve plate 21 will be caused to pivot in a like direction about its pivot connection with the boss 16 by reason of the movement of the key 32 of the actuator ring 30 within the key socket 26 provided by the valve plate 21. In the position shown in FIG. 10, the valve plate has been pivoted so that its orifice 22 is in coaxial alignment with the fluid passage cavity 23, and the valve is in open position.

From the foregoing, it is readily apparent that there is disclosed an in-line valve which has a simple mode of operation, consisting of rotation of the outer actuator ring 30, which in turn pivots a valve plate which is continuously sealed against fluid leakage, irrespective of its pivotal movement or position within the valve housing. The specific arrangement of sealing gaskets carried by the valve plate 21, together with a cooperating stationary sealing gasket 37 positioned about the fluid passage cavities, prevents any possible leakage of fluid passing through the valve.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A valve interpositioned in end-to-end aligned pipe lines, comprising
    a. a housing including complementary end plates in spaced facial abutment, with each plate providing an internally threaded connector defining a fluid passage cavity disposed in coaxial alignment,
    b. a plurality of spacer means connecting said end plates in spaced facial abutment and for coaxially aligning said fluid passage cavities,
    c. a valve plate between said end plates and providing an orifice movable into and out of communication with the fluid passage cavities defined by said connectors,
    d. means for pivotally mounting said valve plate upon one of said spacer means between said end plates,
    e. sealing means carried by said valve plate and extending in a continuous path so as to completely encircle the fluid passage cavity, the orifice formed in the valve plate, and said pivotal mounting means,
    f. actuator means mounted upon the periphery of said end plates and rotatable about an axis parallel to the fluid passage cavities, positioning said valve plate into and out of open and closed position,
    g. and means providing connection between said valve plate and said actuator means whereby said valve plate is pivoted in one direction when said actuator is rotated in said one direction.

2. A valve as defined by claim 1, wherein said means for pivotally mounting said valve plate between said end plates comprises a boss carried by each of said end plates adapted to be axially aligned in abutting relation when said end plates are connected together to form a pivot post for said valve plate.

3. A valve as defined by claim 1, wherein said actuator means comprises a ring disposed about the periphery of said end plates and rotatable about the axis of said fluid passage cavities.

4. A valve as defined by claim 3, wherein said means for pivotally mounting said valve plate between said end plates comprises a boss carried by each of said end plates adapted to be axially aligned in abutting relation when said end plates are connected together to form a pivot post for said valve plate.

5. A valve as defined by claim 4, wherein said means providing connection between said valve plate and said ring comprises an internal key carried by said ring and having a loose connection with a key socket provided by said valve plate for pivoting the same during rotation of said ring about said end plate.

6. A valve as defined by claim 1, wherein said means providing connection between said valve plate and said actuator means comprises an internal key carried by said actuator means and having a loose connection with a key socket provided by said valve plate for pivoting the same during rotation of said actuator means about said end plate.

7. A valve as defined by claim 6, wherein said means for pivotally mounting said valve plate between said end plates comprises a boss carried by each of said end plates adapted to be axially aligned in abutting relation when said end plates are connected together to form a pivot post for said valve plate.

8. A valve as defined by claim 6, wherein said actuator means comprises a ring disposed about the periphery of said end plates and rotatable about the axis of said fluid passage cavities.

* * * * *